US012415143B2

(12) United States Patent
Ducheyne

(10) Patent No.: US 12,415,143 B2
(45) Date of Patent: Sep. 16, 2025

(54) ADVANCED CONTROL METHOD FOR AN EVAPORATION UNIT

(71) Applicant: CALORITUM NV, Antwerp (BE)

(72) Inventor: Wouter Ducheyne, Antwerp (BE)

(73) Assignee: CALORITUM NV, Antwerp (BE)

( * ) Notice: Subject to any disclaimer, the term of this patent is extended or adjusted under 35 U.S.C. 154(b) by 295 days.

(21) Appl. No.: 17/622,433

(22) PCT Filed: Jun. 26, 2020

(86) PCT No.: PCT/EP2020/068075
§ 371 (c)(1),
(2) Date: Dec. 23, 2021

(87) PCT Pub. No.: WO2020/260616
PCT Pub. Date: Dec. 30, 2020

(65) Prior Publication Data
US 2022/0355219 A1    Nov. 10, 2022

(30) Foreign Application Priority Data

Jun. 27, 2019   (GB) ..................... 1909244

(51) Int. Cl.
*B01D 1/00*      (2006.01)
*B01D 3/00*      (2006.01)
(Continued)

(52) U.S. Cl.
CPC ......... *B01D 1/0082* (2013.01); *B01D 1/0017* (2013.01); *B01D 3/006* (2013.01); *B01D 3/148* (2013.01); *C01B 25/163* (2013.01)

(58) Field of Classification Search
CPC .... B01D 1/0017; B01D 1/0082; B01D 3/006; B01D 3/148; C01B 25/163
See application file for complete search history.

(56) References Cited

U.S. PATENT DOCUMENTS 3,025,232 A * 3/1962 Jones, Jr. ................. B01D 3/42
137/4
3,241,599 A * 3/1966 Jobe ..................... B01D 1/0082
159/44
(Continued)

FOREIGN PATENT DOCUMENTS

CN    201059884 Y    5/2008
CN    102072685 A    5/2011
(Continued)

OTHER PUBLICATIONS

International Search Report mailed Sep. 28, 2020 in reference to co-pending European Patent Application No. PCT/EP2020/068075 filed Jun. 26, 2020.
(Continued)

*Primary Examiner* — Jonathan Miller
(74) *Attorney, Agent, or Firm* — DINSMORE & SHOHL LLP

(57) ABSTRACT

The present invention is related to an advanced control method—including a fast response method—to stabilize, optimize and or maximize the output flow of an evaporation unit via ultrasonic controlled sound or vibration applied to the said evaporation unit. The invention further provides equipment wherein said method is being implemented, such as an evaporation or separation unit.

14 Claims, 2 Drawing Sheets

(51) Int. Cl.
    *B01D 3/14*               (2006.01)
    *C01B 25/163*        (2006.01)

(56) References Cited

U.S. PATENT DOCUMENTS

| | | | |
|---|---|---|---|
| 3,273,631 A | 9/1966 | Neuman | |
| 3,317,405 A | 5/1967 | Brown | |
| 3,352,693 A | 11/1967 | Berk | |
| 3,614,682 A * | 10/1971 | Smith | C08F 36/04 |
| | | | 700/89 |
| 3,800,288 A * | 3/1974 | Russell | G07C 3/00 |
| | | | 700/83 |
| 4,604,363 A * | 8/1986 | Newhouse | B01D 1/0082 |
| | | | 422/65 |
| 4,709,111 A * | 11/1987 | Ward | C07C 2/08 |
| | | | 585/503 |
| 6,821,660 B2 * | 11/2004 | Andrews | B01F 23/12 |
| | | | 429/442 |
| 7,603,889 B2 * | 10/2009 | Cypes | B01D 3/00 |
| | | | 73/61.79 |
| 9,170,184 B2 * | 10/2015 | Thiele | G01N 11/00 |
| 9,802,139 B2 * | 10/2017 | Priest | B01D 1/0082 |
| 2002/0110714 A1 * | 8/2002 | Andrews | B01F 25/431 |
| | | | 261/138 |
| 2006/0032935 A1 * | 2/2006 | Matsuura | B01D 5/0039 |
| | | | 239/9 |
| 2007/0017291 A1 * | 1/2007 | Cypes | B01D 3/322 |
| | | | 73/590 |
| 2007/0193871 A1 * | 8/2007 | Wiseman | B01D 1/2896 |
| | | | 202/185.3 |

FOREIGN PATENT DOCUMENTS

| | | |
|---|---|---|
| CN | 202128923 U | 2/2012 |
| CN | 205019745 U | 2/2016 |

OTHER PUBLICATIONS

Intellectual Property Office in reference to co-pending Foreign Application No. GB1909244.4 filed Jun. 27, 2019.

Written Opinion mailed Sep. 28, 2020 in reference to co-pending European Patent Application No. PCT/EP2020/068075 filed Jun. 26, 2020.

Song, et al., "Thermal performance of a novel ultrasonic evaporator based on machine learning algorithms", Applied Thermal Engineering, vol. 148, pp. 438-446, Nov. 22, 2018, XP085608942.

* cited by examiner

ADVANCED CONTROL METHOD FOR AN EVAPORATION UNIT

CROSS REFERENCES TO RELATED APPLICATIONS

This application is a national-stage application under 35 U.S.C. § 371 of International Application No. PCT/EP2020/068075, filed Jun. 26, 2020, which International Application claims benefit of priority to Great British Patent Application No. 1909244.4, filed Jun. 27, 2019.

FIELD OF THE INVENTION

The present invention is related to an advanced control method—including a fast response method—to stabilize, optimize and or maximize the output flow of an evaporation unit via ultrasonic controlled sound or vibration applied to the said evaporation unit. The invention further provides equipment wherein said method is being implemented, such as an evaporation or separation unit.

SUMMARY OF THE INVENTION

A method of regulating/controlling the physical properties such as Vapor Pressure, Viscosity, Temperature, Composition and/or Density of the liquid fraction and/or vapour fraction of an output stream of an evaporation unit, said method comprising;
  a. Providing setpoint values for the physical properties of the liquid fraction of the output stream and/or of the vapor fraction of the output stream of said evaporation unit;
  b. Measuring one or more of the physical properties of the liquid fraction of the output stream and/or one or more of the physical properties of the vapor fraction of the output stream of said evaporation unit;
  c. Comparing the provided setpoint values with the measured values of the physical properties of the liquid fraction of the output stream and/or of the physical properties of the vapor fraction of the output stream of said evaporation unit; and
  d. Adjusting the physical properties of the liquid fraction of the output stream and/or the physical properties of the vapor fraction of the output stream of said evaporation unit to match the setpoint values by adjusting the energy input of the vaporization input characterized in that the energy input is a combination of heat and ultrasound.

It is in particular an object of the present invention to provide a method of regulating/controlling the Vapor Pressure and/or the Viscosity of the liquid output stream (M3) of an evaporation unit (10), said method comprising;
  a. Providing setpoint values (S4) for the Vapor Pressure and/or Viscosity of the liquid output stream (M3);
  b. Measuring the Vapor Pressure and/or Viscosity (Q4) of the liquid output stream;
  c. Comparing the provided setpoint values with the measured values of the Vapor Pressure and/or Viscosity of the liquid output stream; and
  d. Adjusting the Vapor Pressure and/or Viscosity of the liquid output stream to match the setpoint values by adjusting the energy input of the vaporization input characterized in that the energy input is a combination of heat (A1) and ultrasound (I1). In one embodiment the method according to the invention the evaporation unit is selected from a heat exchanger; a distillation tower or part of it; a falling film installation; a forced circulation heat exchanger; a rising film installation; a thermosyphon or the like.

In another embodiment of the methods according to the invention the comparison of the setpoint values with the measured values includes the use of a neural network. As detailed below, in a further embodiment the comparison includes calculating or predicting the physical properties of a stream (infra).

Besides product parameters of the liquid output stream (M3), the method may also include measuring the properties of one or more of the different product streams across the evaporation unit, such as the Feed stream (M0), the Vapor Output stream (M2), the Heat input stream (A1), the Vapor properties (Q5) at the top or heating section of the evaporation unit (20) and the properties of the Separation Vapor-Liquid (Q6) at the bottom section (30) of the evaporation unit. In one embodiment the method according the different embodiments of the invention accordingly comprises measuring quality parameters (also referred to as properties) of the heat input stream (A1). In another embodiment the method according to the invention comprises measuring quality parameters (also referred to as properties) of the feed stream (M0) to the evaporation unit. In another embodiment the method according to the invention comprises measuring quality parameters (also referred to as properties) of the Vapor properties (Q5) at the top of the evaporation unit. In another embodiment the method according to the invention comprises measuring quality parameters (also referred to as properties) of the Separation Vapor-Liquid (Q6) at the bottom section of the evaporation unit. In another embodiment the method according to the invention comprises measuring measuring quality parameters (also referred to as properties) of the Vapor output stream (M2). In another embodiment the method according to the invention comprises measuring quality parameters (also referred to as properties) of at least two, three, four or all of the streams selected from the Feed stream (M0), the Vapor Output stream (M2), the Heat input stream (A1), the Vapor properties (Q5) at the top or heating section of the evaporation unit and the properties of the Separation Vapor-Liquid (Q6) at the bottom of the evaporation unit.

The method as herein provided can be applied to any evaporation or separation unit wherein a liquid-liquid or gas-liquid mass transfer is taking place. This could for example include the removal of a solvent from a mixture or the removal of product in case of an equilibrium reaction. Possible examples on the removal of the solvent are detailed hereinafter, but in a preferred embodiment the method is applied in removing water from a condensation reaction, in particular an endothermic oligomerisation reaction; more in particular the endothermic oligomerisation reaction of an oxoacid; even more in particular the endothermic oligomerisation reaction of a phosphoric acid, as schematically shown in FIG. 1.

All of the foregoing implies that the feed stream is exposed to the mass transfers in the evaporation/separation unit. Thus in one embodiment the feed stream comprises reagents undergoing a condensation reaction in the evaporation unit. In a particular embodiment said condensation reaction is an endothermic oligomerisation reaction; more in particular the endothermic oligomerisation reaction of an oxoacid; even more in particular the endothermic oligomerisation reaction of a phosphoric acid.

In the different embodiments of the method according to the invention quality parameters (herein also referred to as properties) are at least determined for the liquid output stream (M3), and optionally also for at least two, three, four or all of the streams selected from the Feed stream (M0), the Vapor Output stream (M2), the Heat input stream (A1), the Vapor properties (Q5) at the top or heating section of the evaporation unit and the properties of the Separation Vapor-Liquid (Q6) at the bottom of the evaporation unit. For each of said streams throughout the evaporation unit the quality parameters include at least one parameter selected from the group consisting of composition, temperature, vapor pressure, density, flow and viscosity. Where in a first embodiment the quality parameters (Q4) of the liquid output stream (M3) are compared with the setpoint values (S4) of said stream, and based thereon the energy input is being adjusted, this adjustment of energy input can be refined based on a comparison of the measured quality parameters of the remaining streams with setpoint values for each of said streams. Hence in an embodiment the method according to the invention further comprises determining quality parameters for at least two, three, four or all of the streams selected from the Feed stream (M0), the Vapor Output stream (M2), the Heat input stream (A1), the Vapor properties (Q5) at the top or heating section of the evaporation unit and the properties of the Separation Vapor-Liquid (Q6) at the bottom of the evaporation unit; comparing said quality parameters with setpoint values for said at least two, three, four or all of the streams selected from the Feed stream (M0), the Vapor Output stream (M2), the Heat input stream (A1), the Vapor properties (Q5) at the top or heating section of the evaporation unit and the properties of the Separation Vapor-Liquid (Q6) at the bottom of the evaporation unit; and using the result of said comparison as a further input in adjusting the energy input in the evaporation unit. In a particular embodiment the result of said comparison(s) is input for the Control Module (40) managing the energy input to the evaporation unit, i.e. managing the Heat Input Stream (A1) and the Ultrasonic vibration generator(s) (G1 and/or G2). In one embodiment the Heat Input Stream (A1) is kept more or less level, and changes in energy input are driven by the Ultrasonic vibration generator(s) (G1 and/or G2). In such configuration a fast response to changes in quality parameters of the liquid output stream (M3) can be achieved. Thus in a method the adjustment of the energy input is an increase or decrease of the ultrasound input to the vaporization unit.

One of the benefits of the method according to the invention has to do with the fast response using ultrasound as one of the energy inputs. The response time in energy input is even faster than the properties—being temperature and/or composition and/or viscosity and/or polymerisation—of the liquid output stream can be measured. Consequently, in a specific embodiment according to the invention, in the comparison of the measured values with the setpoint values, the parameters with a slow response time like temperature, composition, viscosity and/or degree of polymerization will be adjusted by the control algorithm (50) taking into account the fast response time of the Ultrasonic vibration generator(s) (G1 and/or G2), the dead times of the pressure measurement devices present within said evaporation unit and the physical properties correlations of the liquid output stream. In a particular embodiment said control algorithm includes the use of a neural network to predict the physical properties of a stream. This prediction is based on the values measured over time, correlated to at least the energy input of the vaporization input. In a further embodiment the prediction is based on the values measured over time, correlated to the energy input of the vaporization input, the dead times of the pressure measurement devices present within said evaporation unit and the physical properties of the liquid output stream.

The adjustment by the ultrasonic energy input in the methods according to the invention results in less than 60 s to the desired quality parameter, such as a desired temperature at given operating pressure and given composition of the liquid output stream, of the liquid output stream.

BRIEF DESCRIPTION OF THE DRAWINGS

With specific reference now to the figures, it is stressed that the particulars shown are by way of example and for purposes of illustrative discussion of the different embodiments of the present invention only. They are presented in the cause of providing what is believed to be the most useful and readily description of the principles and conceptual aspects of the invention. In this regard no attempt is made to show structural details of the invention in more detail than is necessary for a fundamental understanding of the invention. The description taken with the drawings making apparent to those skilled in the art how the several forms of the invention may be embodied in practice.

DETAILED DESCRIPTION OF THE INVENTION

The present invention provides a control method—including a fast response method—to stabilize, optimize and or maximize the output flow of an evaporation unit via ultrasonic controlled sound or vibration applied to the said evaporation unit.

Figure 1:
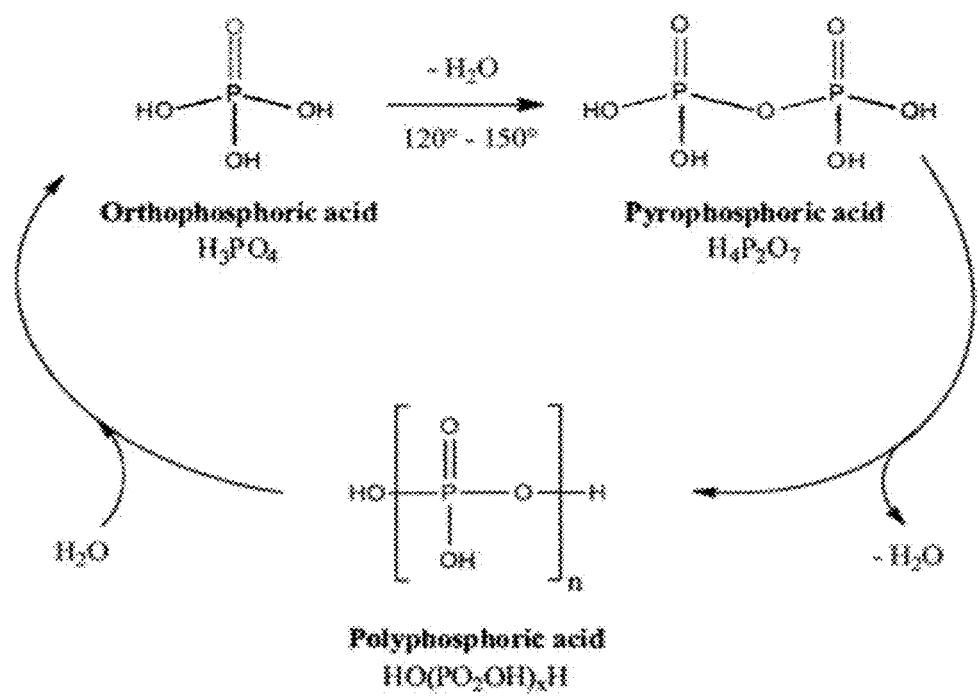
FIG. 1: Schematic representation of the reactions in the heat transforming system relying on the endothermic oligomerisation/condensation reaction of Ortho-/Pyro-phosphoric acid with the removal of water and the exothermic hydrolysis/solvation reaction of the polyphosphoric acid with water.
Figure 2:
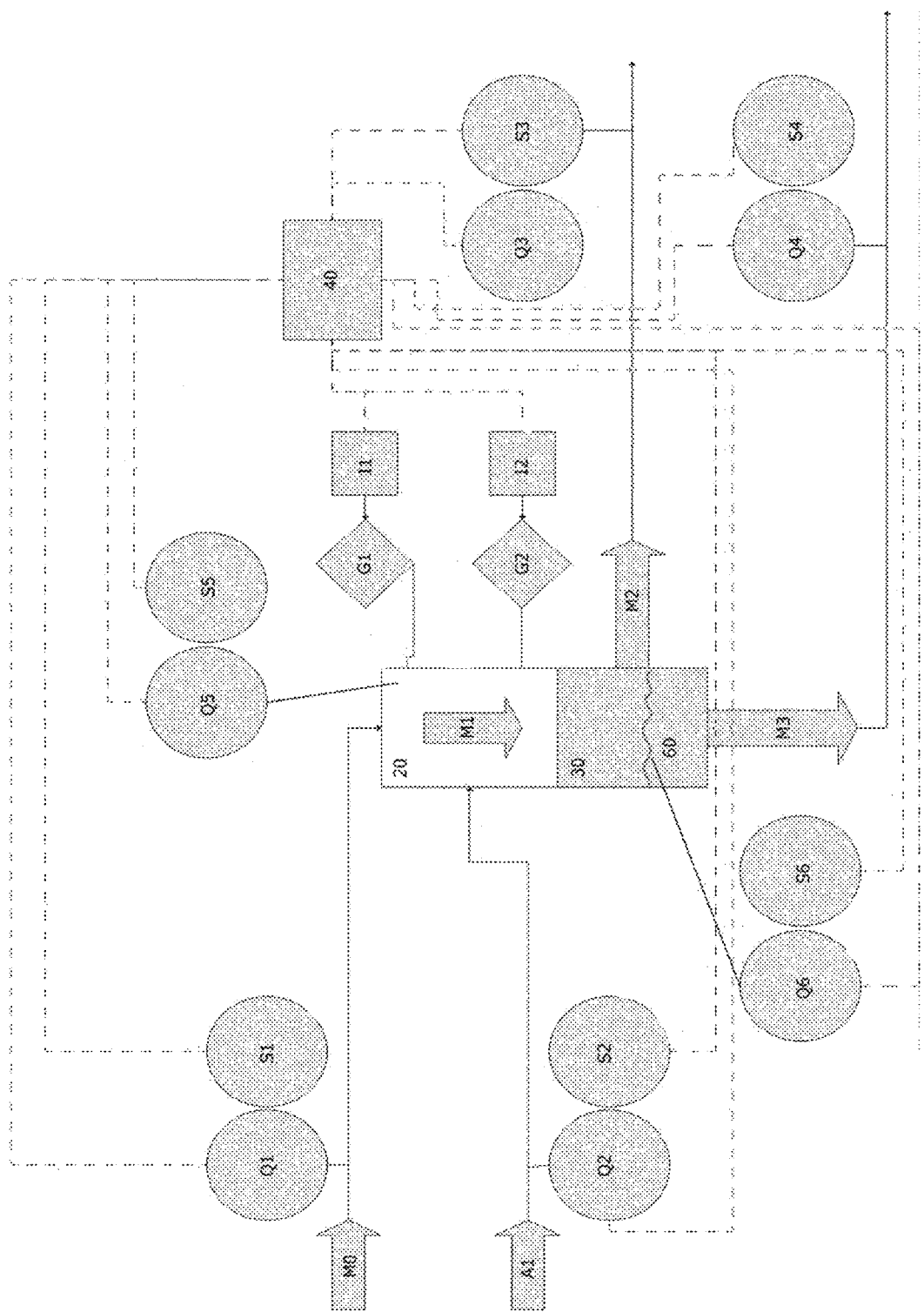
FIG. 2: Schematic representation of an advanced control system for an evaporation unit according to the invention, including Ultrasonic Vibration Generators (G1, G2) and a Control Module (40) receiving measured values (Q1 to Q6) of the input (M0, A1) and the output flows (M2, M3) of the evaporation unit. Said measured values are compared with the set values (S1 to S6) by the Control Module (40) to set the energy input to the evaporation unit as a combination of a heat input (A1) and input parameters (I1, I2) to the Ultrasonic Vibration Generators (G1, G2). In the exemplified embodiment, the evaporation unit is a falling film (M1) installation, with a heating section (20) at the top of the evaporation unit and a Vapor-Liquid separation section (30) at the bottom, yielding as output flows a vapor fraction (e.g. vapor of the solvent) (M2) and a liquid fraction (e.g. concentrated flow or a polymerised flow of the Feed stream (M0)) (M3). Parameters measured and set at the different locations, include but are not limited to Composition, Flow, Temperature, Pressure, Density and Viscosity.

A schematic representation of an evaporation unit comprising such control method is provided in FIG. 1. One can see the following:

A Feed stream (M0), having the Feed stream properties (Q1) which needs to be handled in the evaporation or separation unit (10) i.e. a mixture (can be homogenic or heterogenic) from which one or more components need to be evaporated and or separated from the other component(s):

these components that need to be evaporated or separated from the other components include any kind of component with a higher vapor pressure or fugacity then the other components at the evaporation conditions across the evaporation unit, including the evaporation conditions in the vapor phase (Q5) and/or the evaporation conditions in the liquid phase (Q6) of the evaporation. This can also be a product generated by any type of physico chemical reaction in the evaporation unit other or the same than present in the input stream these components that need to be evaporated or separated from the other components also include any kind of component with the same vapor pressure as some other components at evaporation conditions across the evaporation unit, including the evaporation conditions in the vapor phase (Q5) and/or the evaporation conditions in the liquid phase (Q6) of the evaporation unit. This can also be a product generated in the evaporation unit other or the same as present in the input stream A liquid output stream (M3) coming directly from the evaporation unit without being subjected to any other process step. The properties of this liquid output stream (Q4) (e.g. composition, temperature, pressure, viscosity, conductivity, mass flow, density, etc.) as depicted in the FIG. 1 can be reached by direct measurement or after being processed to another process step such as e.g. but not limited to further evaporation, cooling, heating, reaction, etc.

A Vapor output stream (M2) coming directly from the bottom section of the evaporation unit (30) without being subjected to any other process step. The properties of this vapour output stream (Q3) (e.g. composition, temperature, pressure, viscosity, conductivity, mass flow, density, etc.) as depicted in the FIG. 1 can be reached by direct measurement or after being processed to another process step such as e.g. but not limited to condensation, cooling, heating, reaction, etc.

The vapor properties (Q5) at the top section, typically also referred to as the heating section (20), of the evaporation or separation unit, i.e. the section where the feed stream is subjected to the energy input, such as for example through a falling film (M1) configuration. The properties of the vapor in this section (e.g. composition, temperature, pressure, viscosity, conductivity, mass flow, density, etc.) as depicted in the FIG. 1 can be reached by direct measurement or after being processed to another process step such as e.g. but not limited to condensation, cooling, heating, reaction, etc.

The properties (Q6) of the Separation Vapor-Liquid (60) at the bottom section of the separation unit (30), typically referred to as the concentrating and separating section, of the evaporation or separation unit. The properties (Q6) of the Separation Vapor-Liquid (60) (e.g. composition, temperature, pressure, viscosity, conductivity, mass flow, density, etc.) present in the concentrating and separating section as depicted in the FIG. 1 can be reached by direct measurement or after being processed to another process step such as e.g. but not limited to condensation, cooling, heating, reaction, etc.

Heat input (A1) for the heating section or during the concentrating/separation section coming from a stream with properties Q2 such as e.g. steam being cooled, condensed and or subcooled, thermal oil being cooled, water being cooled, organic vapors being condensed, organic liquids being cooled down, inorganic liquids being condensed or cooled down, any kind of vapors being condensed and or subcooled, any kind of liquids being cooled.

A distinction is made on the drawing between measured value and desired values or setpoints. The setpoint(s) are generated by the intelligent control method(s) or by the intelligent control algorithm(s) or they can be set manually or automatic by the operator of such a unit. Thus in one embodiment the unit comprises a user input interface (70) to set the setpoint values for each of the properties mentioned herein before, i.e. setpoint values for the Feed stream properties (S1), for the Heat input properties (S2), for the Vapour Output stream properties (S3), for the Liquid Output stream properties (S4), for the Vapor properties at the heating section (S5) of the evaporation unit, and for the properties of the Separation Vapor-Liquid (S6). In another embodiment the unit comprises an Control Module (40), in particular an Intelligent Control Module, enabling that the setpoint values are set automatically.

that the unit is characterized in comprising at least one Ultrasonic vibration generator (G1, G2) enabling a fast change in energy input into the evaporation unit and accordingly providing an improved control over the desired output of the evaporation unit.

The need to have an improved control over the desired output of the evaporation unit is prompt by the fact that all streams in an industrial installation continuous undergo variations of any kind, this can be a change in flow, composition temperature, pressure, viscosity, conductivity, density, electric capacity, magnetic properties or any other parameter. In order to maintain the desired output these changes require a continues adjustment of the conditions within the evaporation unit, but;

All measuring devices have a dead time, i.e. the time lapse between the change in a parameter and the measuring of it by a measuring device.

For pressure devices, typically this is rather in the range of several seconds as for temperature measurements its rather several minutes. Therefor in existing installations the control algorithms to react to the changes typically have a feed forward that incorporates changes to pressure faster than changes in temperature, mostly in such a way that the link between temperature and pressure are correlated by vapor pressure equilibrium; and changes in the composition are quiet often only indirectly monitored through changes in pressure and temperature, both correlated to changes in composition as the vapor pressures of different compositions change accordingly.

Evidently the changes in composition are going to have an impact on the viscosity, density, conductivity, . . . of the liquid output stream. And this is for most industrial processes the key product quality driver to be kept constant. The online measuring of among others but not limited to direct crucial product and or process parameters to steer a constant output quality is implemented globally across process industry. Most control algorithms consider that changing parameters of an input flow Q1 such as in our example depicted in FIG. 1 will impact the output quality and therefor changes to the operating conditions Q5 & Q6 or others are made to the installation to steer towards a steady output quality. Nevertheless, the most widely used pressure and temperature measurement are having several minutes of reaction time to steer product quality and therefor product quality still changes in time.

It is widespread known in industry and its processes, the better quality can be controlled in a continuous stable way without big variations, the higher an installation can run to its limits and moreover to its maximal capacity. Capacity could mean many things such as but not limited to e.g. hourly production rate, daily production rate, any output production flowrate but also degree of polymerization in function of an output rate, maximum viscosity that can be processed, temperature difference on a heat exchanger . . . .

Some research has been done & published, see background about ultrasonic improvement of mas transfers in liquid-liquid interactions. In literature one even speaks of improvements up to 10× (Thèse de Frédéric Laugier, LES ULTRASONS EN PROCÉDÉS POLYPHASIQUES: TRANSFERT GAZ-LIQUIDE ET RÉACTION LIQUIDE-LIQUIDE, Oct. 30, 2007) on mass transfer in liquid-liquid interactions and faster vapor removal from liquid mixtures or streams. It is however not clear to predict—based on current research—whether a quantitative effect of Ultrasound (US) on evaporation for a specific case is to be expected.

However, the qualitative effect is well known: the response time of US applied to an equipment in which the evaporation takes places is extremely short. Hence, if there is a positive effect on evaporation, once the US has been applied, less then few seconds later more liquid is evaporated from the mixture.

Therefor Caloritum has now done its own research to find optimal operational conditions in an evaporation unit, using US for evaporation from a solvent out of a mixture. It is claimed below to have found and created a new method of making a process more stable in output liquid stream and push the process to the limits of its capacity in a broad way of applications.

Test Configuration:
An evaporation unit for the evaporation of water out of phosphoric acid and water was operated at its max capacity—being 97% steady state but varying with +/−3% during the time of the test.

Ultrasound has been applied to the evaporation equipment at a range of 50-100% of its capacity. This corresponded to an increase of evaporation by 10-20%. I.e. by applying the ultrasound 10-20% more heat was absorbed by evaporation of water. In other words, the max capacity was between 107%+/−3% up to 117%+/−3%. Compared to changes in steam input to increase or decrease the amount evaporation, applying US has within a few seconds, i.e. 2, 3, 4, 5, 6, 7, 8, 9, 10, 15, 20 seconds an effect on the evaporation of water out of the endothermic oligomerisation reaction of a phosphoric acid.

Thanks to this new method, wherein Ultra sonic sound vibrations are added as part of the energy input into the heating section, of the evaporation or separation unit, it was found that the continuous changes/variations to the output quality could be diminished with a narrower spread of 0.5% instead of 3%. This is due to the implementation of fast reactions on the evaporation implied by the US generation on the equipment and taking into account the different dead times of the different measuring devices but also taking into account the physical properties correlations such as vapor pressures in function of temperatures and compositions of said mixtures. Thus, by adding the fast US response to the Control algorithms, the production capacity could be operated in steady state modus for long time to 119.5%+/−0.5%.

It is accordingly an object of the present invention to provide an advanced control method to stabilize, optimize and or maximize the output flow of an evaporation unit using the combination of an Ultrasonic vibration generator with a heat input stream, said method comprising control algorithms taking into account the fast response time of the Ultrasonic vibration generator, the dead times of the pressure measurement devices present within said evaporation unit and the physical properties correlations of the liquid output stream.

Such configuration, wherein US is added as part of the heating section to control the physical properties of the liquid fraction and/or vapour fraction of an output stream of an evaporation unit is also contrary to current US application in for example cooling towers such as described in CN201059884 or CN102072685, where it is used to facilitate water mist condensation of the hot feed stream in the cooling tower but not connected with the energy input to the evaporation unit as in the present invention.

CONCLUSION

In a test setup (see schematic representation in FIG. 1) it was proven that the control method, also referred to as a 'smart' fast response method implemented in an algorithm in combination with an ultrasonic wave generator applied on an equipment for evaporation or liquid vapor separation, improves the stability of an evaporation process and improves the production rate up to 20% more (can be more or less depending of the specific configuration).

This invention can widely be implemented in process industry wherein a liquid-liquid or gas-liquid mass transfer occurs such as e.g. but not limited to:
Falling film evaporators
Evaporators
Distillation equipment Possible processes comprising such mass transfers, include for example;
Removal from water out of an acid to increase the concentration of the acid:hydrochloric acid, sulphuric acid, nitric acid, phosphoric acid and many more
Removal from water out of alcohols such as but not limited to methanol, ethanol, propanol, . . . .
Removal from a solvent out of an mixture such as but not limited to: toluene from acids, toluene from water, toluene from amines, aromatics from alkenes, alkanes from alkenes, olefins from non-olefins.

The invention claimed is:
1. A method of controlling physical properties of a liquid fraction and/or a vapour fraction of an output stream of an evaporation unit, the method comprising:
providing setpoint values for the physical properties of the liquid fraction of the output stream and/or of the vapor fraction of the output stream of the evaporation unit;
measuring one or more of the physical properties of the liquid fraction of the output stream and/or one or more of the physical properties of the vapor fraction of the output stream of the evaporation unit;
comparing the provided setpoint values with the measured values of the physical properties of the liquid fraction of the output stream and/or of the physical properties of the vapor fraction of the output stream of the evaporation unit; and
adjusting the physical properties of the liquid fraction of the output stream and/or the physical properties of the vapor fraction of the output stream of the evaporation unit to match the setpoint values by adjusting an energy input of the vaporization input, wherein the energy input is a combination of a heat input stream and an ultrasound input, and wherein adjusting the energy input comprises keeping the heat input stream level and adjusting the ultrasound input, and wherein a control algorithm for adjusting the physical properties accounts for a fast response time of the adjusting of the ultrasound input and for dead time of pressure measurement devices within the evaporation unit.

2. The method according to claim 1, wherein the evaporation unit is selected from a heat exchanger, a distillation tower or a part of a distillation tower, a forced circulation heat exchanger, a falling film installation, a rising film installation, or a thermosyphon.

3. The method according to claim 1, wherein comparing the provided setpoint values with the measured values includes the use of a neural network to predict the impact of the energy input on the output properties.

4. The method according to claim 1, wherein comparing the provided setpoint values with the measured values includes the use of a neural network to predict the physical properties of a stream.

5. The method according to claim 1, comprising measuring quality parameters of the energy input.

6. The method according to claim 1, comprising measuring quality parameters of a feed stream to the evaporation unit.

7. The method according to claim 6, wherein the feed stream comprises reagents undergoing a reaction in the evaporation unit.

8. The method according to claim 7, wherein the feed stream comprises reagents undergoing a condensation reaction in the evaporation unit.

9. The method according to claim 8, wherein the condensation reaction is an endothermic oligomerisation reaction.

10. The method according to claim 8, wherein the condensation reaction is an endothermic oligomerisation reaction of a phosphoric acid.

11. The method according to claim 8, wherein the condensation reaction is an endothermic oligomerisation reaction of an oxoacid.

12. The method according to claim 6, wherein the quality parameters include at least one parameter selected from the group consisting of composition, temperature, vapor pressure, density, flow, and viscosity.

13. The method according claim 1, wherein adjusting the energy input comprises keeping the heat input stream level and increasing or decreasing the ultrasound input.

14. The method according to claim 1, wherein the physical properties are selected from the group consisting of vapor pressure, viscosity, temperature, composition, density, and combinations thereof.

* * * * *